Feb. 18, 1969  G. G. D. SOUTHARD  3,428,313
BALL PATH COMPUTER SYSTEM
Filed Dec. 9, 1965
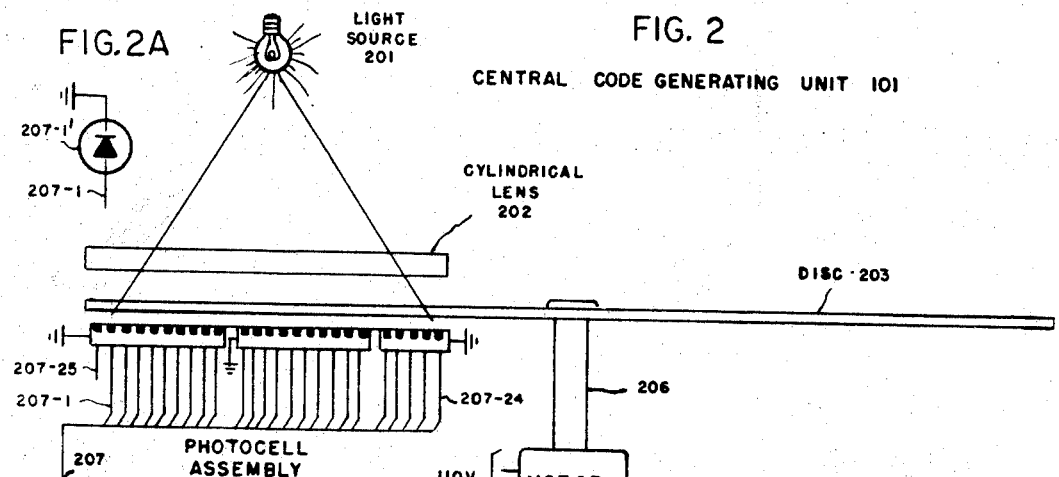
FIG. 2A
FIG. 2
CENTRAL CODE GENERATING UNIT 101
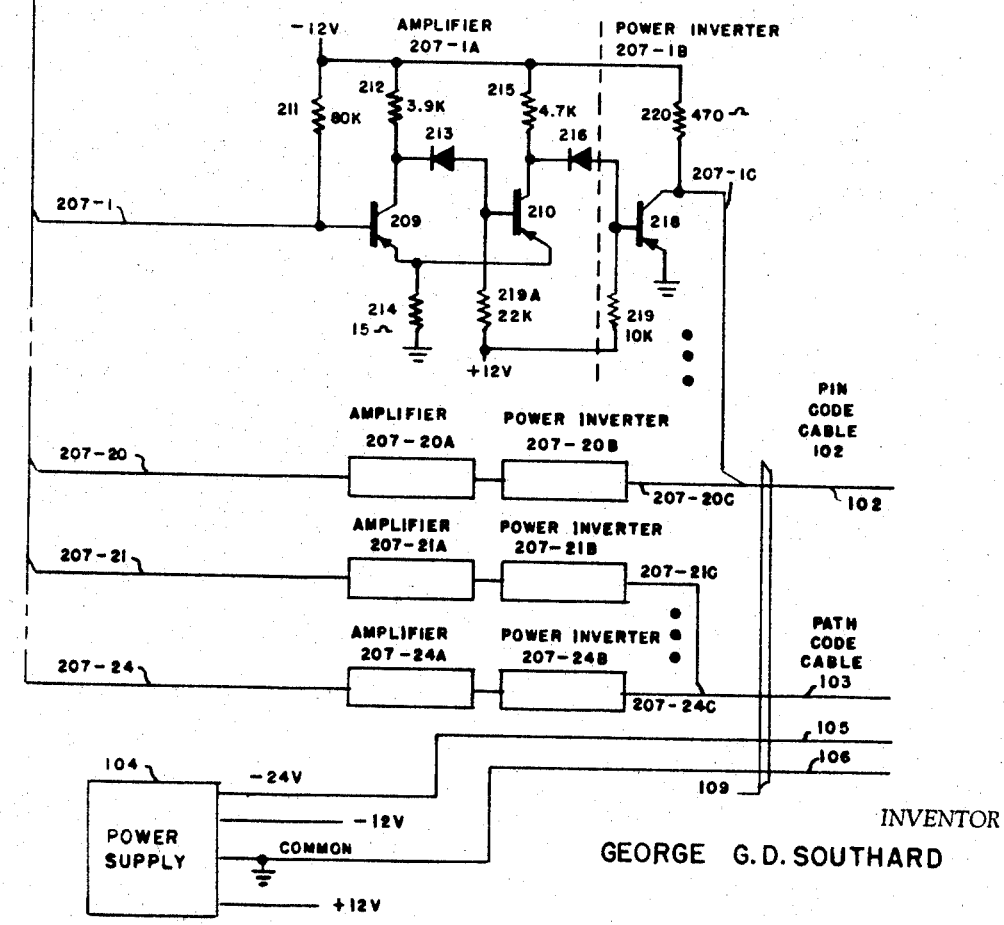
INVENTOR
GEORGE G. D. SOUTHARD
BY
ATTORNEY

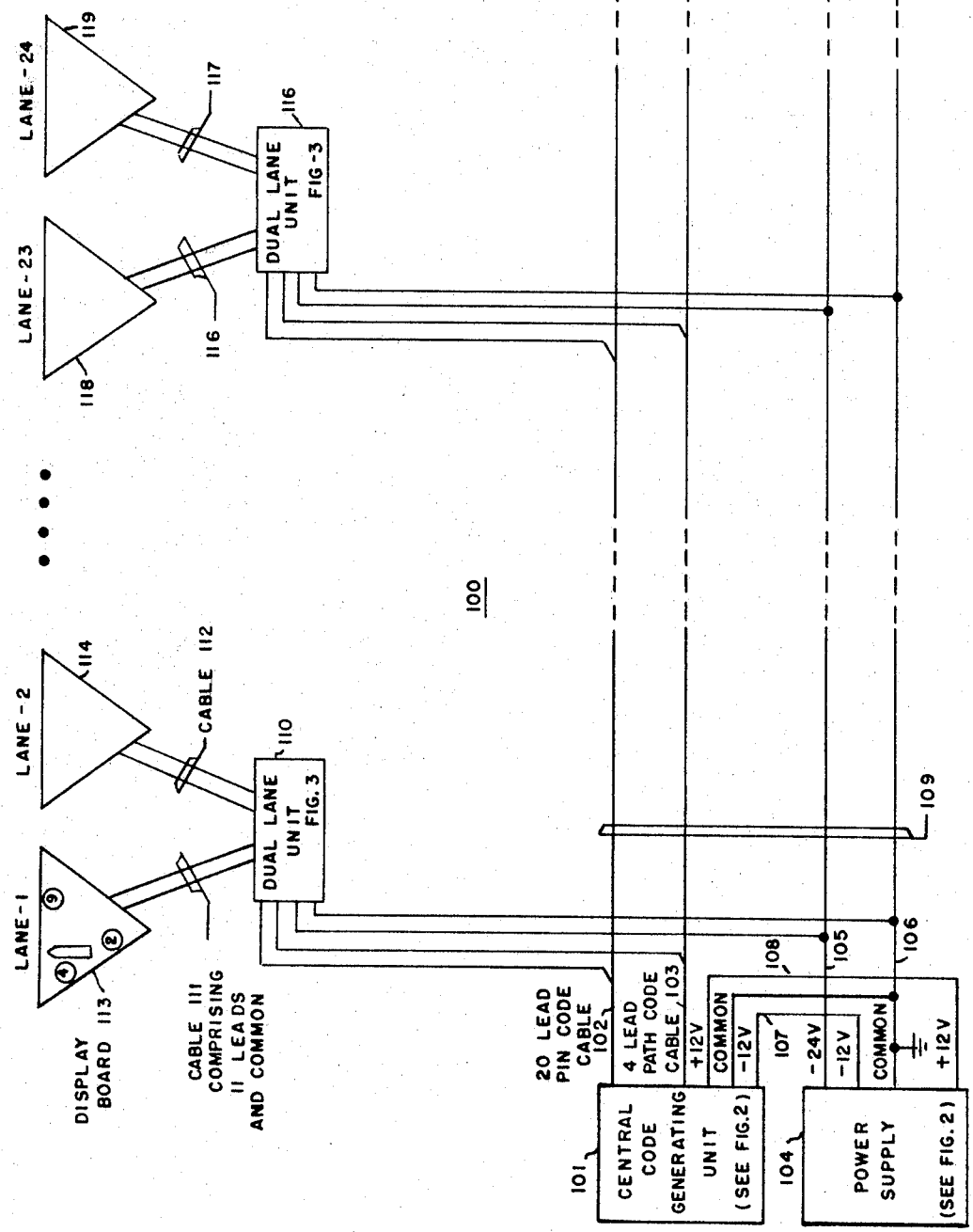

DUAL LANE UNIT 110

INVENTOR
GEORGE G. D. SOUTHARD

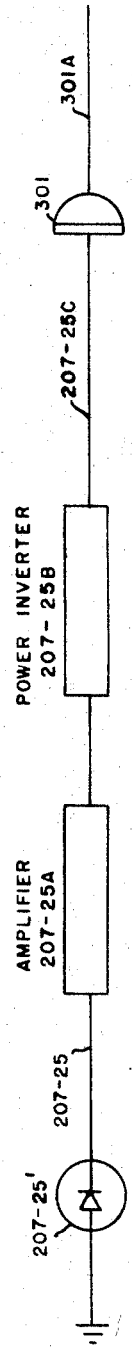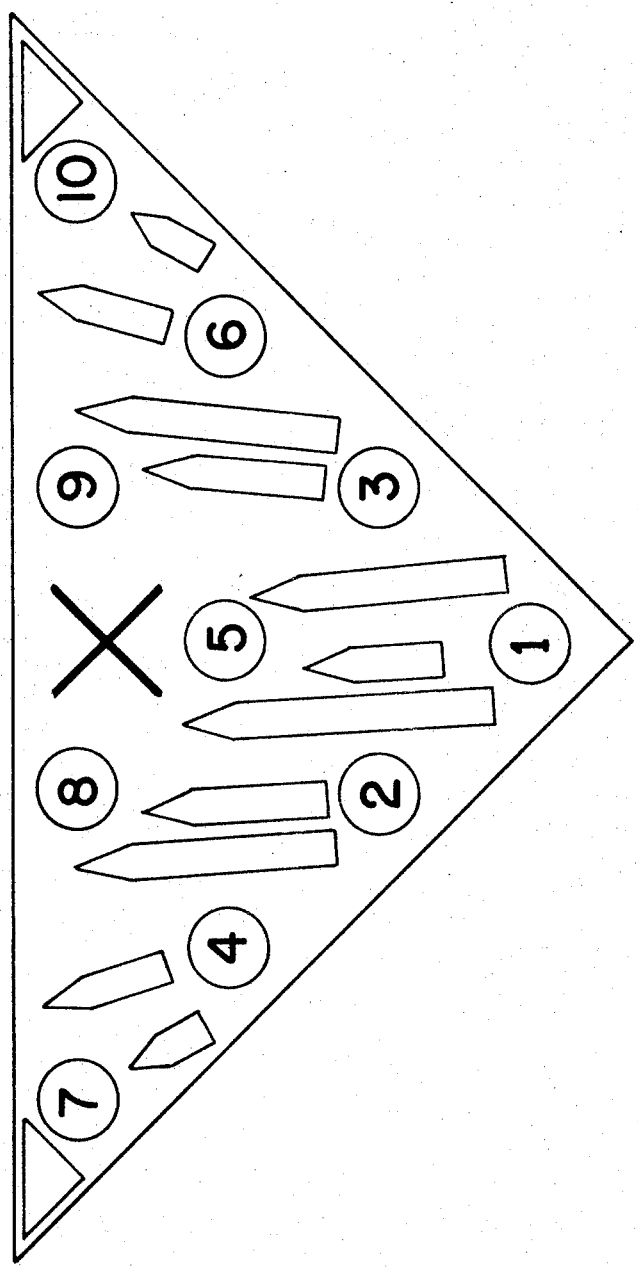

United States Patent Office 3,428,313
Patented Feb. 18, 1969

3,428,313
BALL PATH COMPUTER SYSTEM
George G. D. Southard, Galion, Ohio, assignor to North Electric Company, Galion, Ohio, a corporation of Ohio
Filed Dec. 9, 1965, Ser. No. 514,765
U.S. Cl. 273—54  8 Claims
Int. Cl. A63d 5/00

ABSTRACT OF THE DISCLOSURE

System for displaying optimum path for making a spare in bowling equipment using a control signal generator which continually provides two sets of signals to each of the lanes over a first and a second channel, the first set of signals representing different possible pin combinations left standing and the second set of signals identifying the optimum path for the particular combination represented by the signals on the first path. Each lane has comparison means for comparing the pin condition thereat with the first signal group, and for passing the information in the second signal group to associated display equipment whenever coincidence occurs.

---

Figure 3:
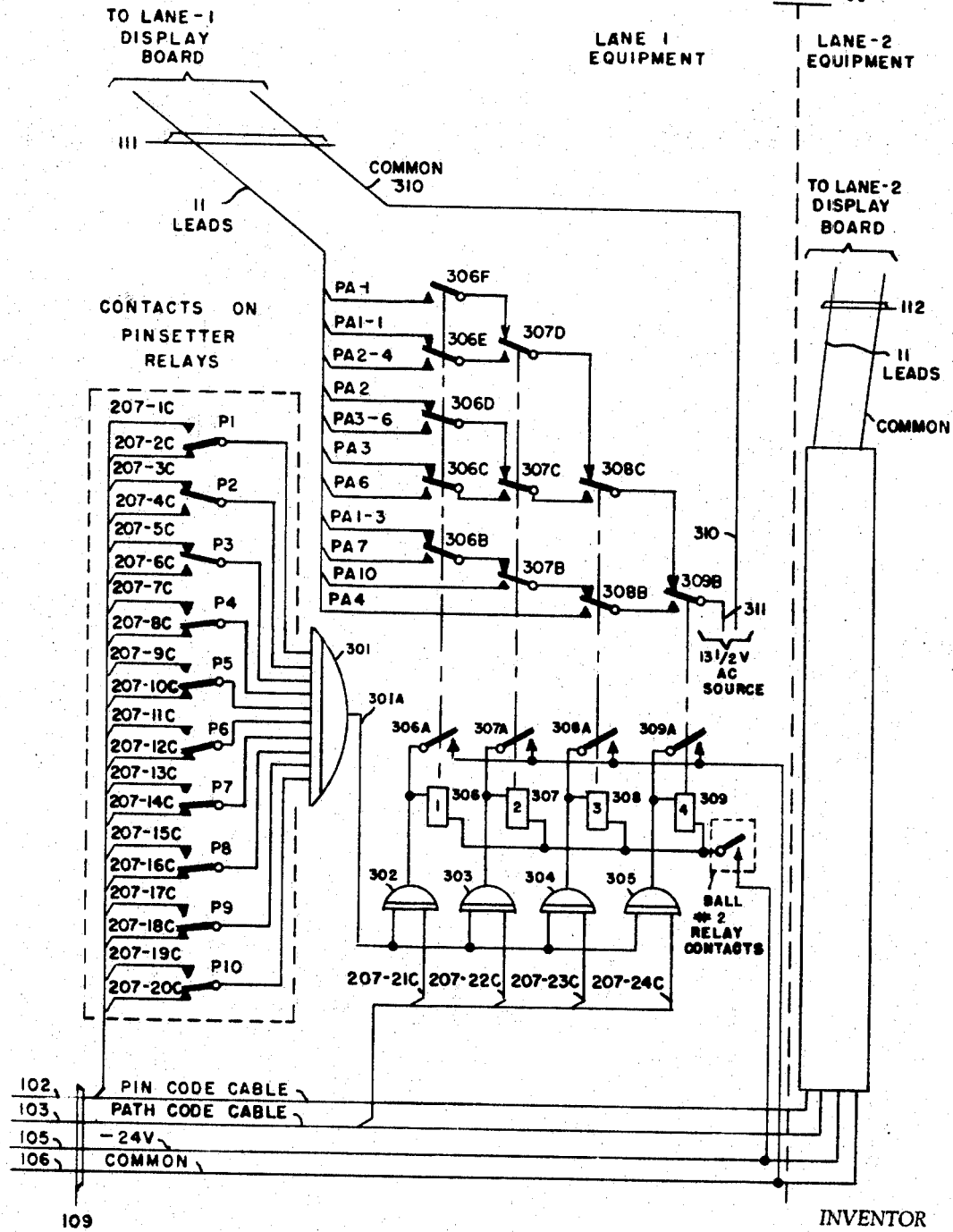

This invention relates to automation systems for bowling equipment, and more specifically to systems for providing display information to a bowler as to the optimum path for knocking down the pins remaining after the first ball has been rolled to obtain a "spare."

The display system of the present invention is particularly well adapted for use with commercial bowling alleys which use automatic pinspotters for resetting the bowling pins, such as are presently manufactured and sold by American Machine and Foundry Company, 261 Madison Ave., New York, N.Y., and Brunswick Corporation, 623 S. Wabash Ave., Chicago, Ill. That is, automatic pinspotters of such type have the ability to detect which pins are up and which are down, and to store the detected information on associated storage means. In certain embodiments a plurality of relays are used for this purpose, the contacts on such relays providing a representation of the condition of the pins. The novel system of the present invention uses the indications provided by the pinspotter relays to compute the optimum path for the spare ball, and to provide a visual display.

Briefly, in bowling, the player is permitted to roll a first ball at ten pins which are arranged in a triangular pattern. Since there are ten pins, there will be $2^{10}=1024$ combinations of pins from zero to ten remaining after the first ball is thrown. If all pins are down this is termed a "strike" and does not require the throwing of a second ball. However, if any pins remain standing after the first ball, the player rolls a second ball in an attempt to knock down the remaining pins to make a "spare."

Thus, there are $2^{10}-1=1023$ combinations of pins up which require rolling of a second ball. Although some of these combinations are considered impossible or highly improbable, the remaining number of possible combinations is still very high.

It will be readily apparent that the provision of equipment capable of recognizing over one thousand different possible combinations, computing the preferred path of eleven possible paths for each of these combinations, and displaying the one of eleven paths which is best suited for the particular pin combination remaining, is in itself complex and difficult. Undoubtedly such recognition and computation could be achieved with expensive computing devices. From a practical standpoint, however, the equipment capable of making such determinations must be of a construction which is reliable and durable in continuous use, which has few or no maintenance problems, and which is sufficiently reasonable in cost to permit installation in the average bowling alley complex. It is further important that the system be of a structure which is readily added to existing bowling installations at a reasonable cost, and with a minimum number of wiring and other modifications.

It is a primary object of the present invention therefore to provide a guidance system of such construction which has these features and advantages.

It is a further object of the invention to provide a system in which a novel inexpensive computer arrangement serves a large number of lanes over a common conductor set multipled to each of the lanes of the installation.

It is an additional object of the invention to provide novel common control information storage means which provide coded indications to each lane in a cyclic manner of the possible combinations of pins remaining after a first ball is thrown, means for comparing the remaining pins in a lane with the different code indications, means in said storage means for providing a coded identification of the preferred path for said pin combination, and display means responsive to the coded identification to identify the optimum path to the bowler.

It is a specific object of the present invention to provide a system of such type in which the information storage means which stores the signals indicating the different possible combinations and the optimum path for each combination comprises a single disc member common to all the lanes which is cyclically scanned by inexpensive photocell scanning equipment.

It is yet another object of the invention to provide a system of such type in which each lane includes a single inexpensive switching unit for receiving the codes from the information storage means in a cyclic manner, means for detecting the code corresponding to the pin pattern remaining after a first ball is received, and means for displaying the optimum path for such combination indicated by the information storage means. In one embodiment the novel unit for each lane comprises only four relays and five "and" gates.

Figure 4:
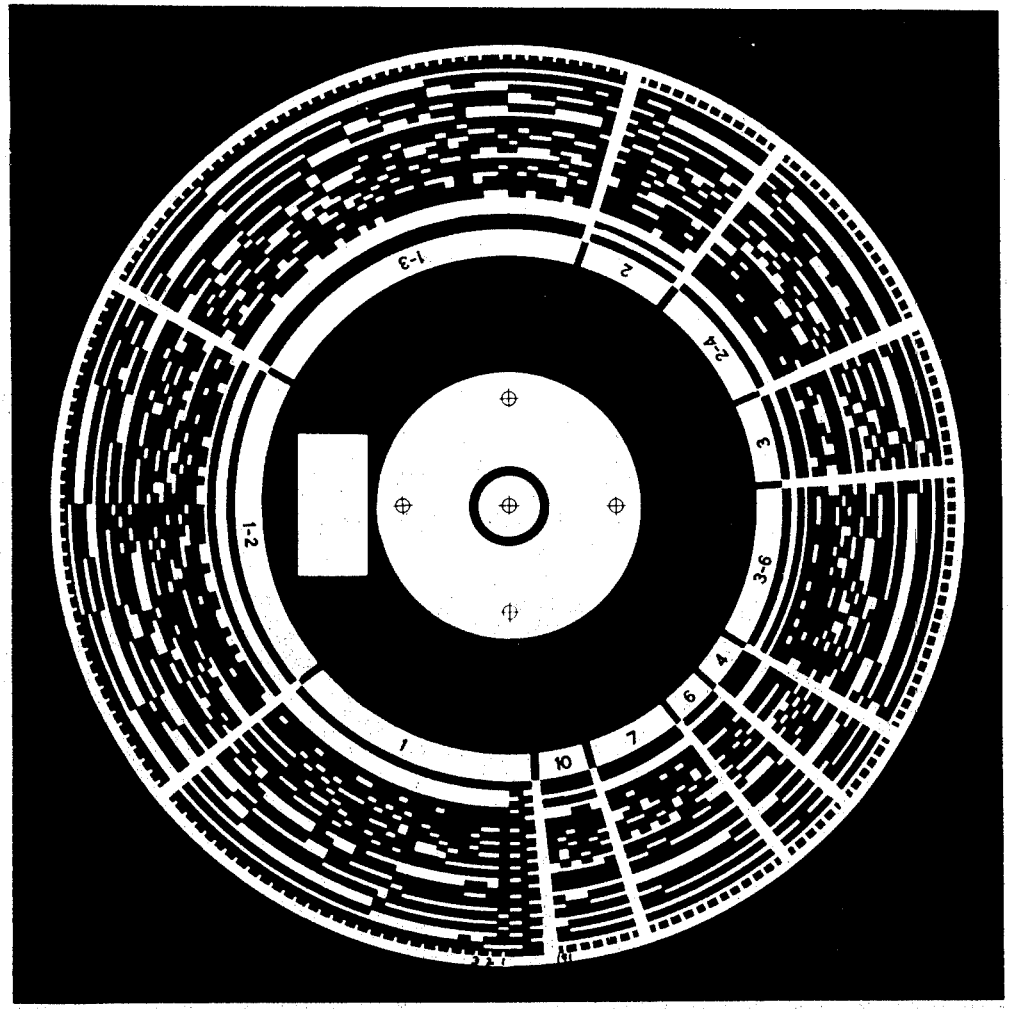
Figure 5:
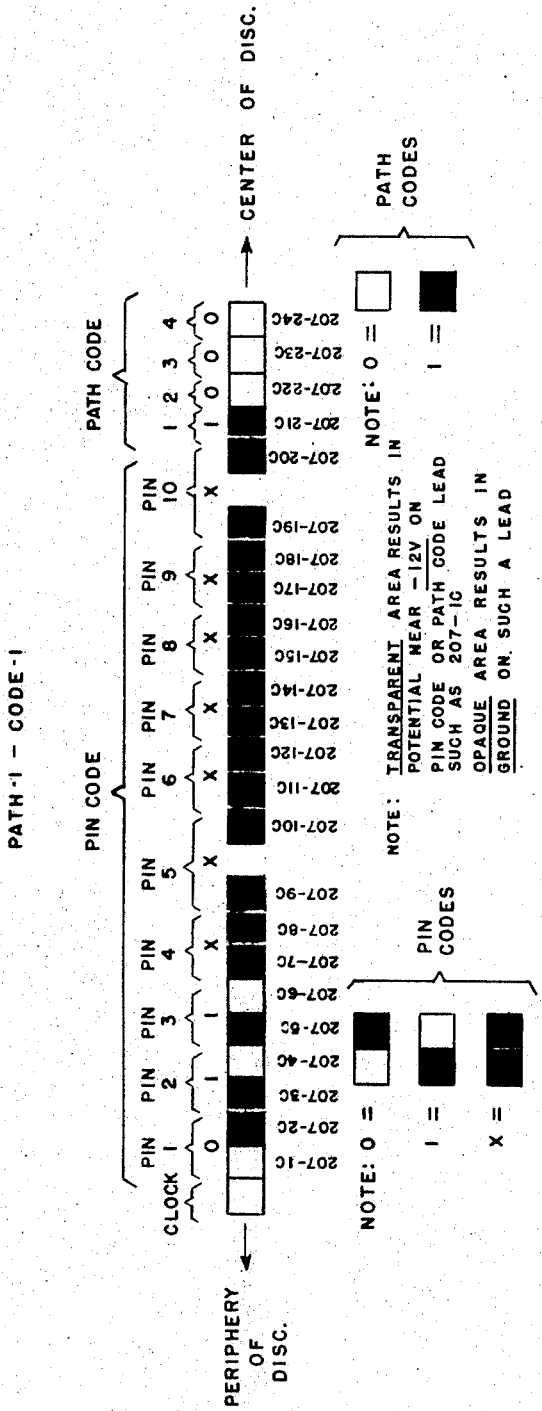
Figure 6:

These and other objects, advantages and features of the invention will be apparent to those skilled in the art from the following detailed description, taken in conjunction with the accompanying drawings in which:

FIGURE 1 is a block diagram of the system;
FIGURE 2 is a schematic diagram of the common or central code generating unit and power supply;
FIGURE 2A is an illustrative showing of representative connections of the photocells in the scanning unit shown in FIGURE 2;
FIGURE 3 is a schematic diagram of the circuitry of the invention included in the lane units of the bowling alley, said circuits being arranged in dual lane units in the illustrated embodiment;
FIGURE 4 is a detailed schematic showing of the control code disc used in the central code generating unit of FIGURES 1 and 2;
FIGURE 5 is an enlarged and detailed schematic of one code of the code disc shown in FIGURE 4;
FIGURE 6 is an alternative arrangement of the codes of the disc of FIGURE 4;
FIGURE 7 is a schematic showing of the eleven spare guide paths illustrated in connection with the pin indicator board; and
FIGURE 8 is a diagrammatic showing of such system as modified to respond to clock pulses on the code disc.

GENERAL DESCRIPTION

In accomplishing the desired guidance for the bowlers, a common or central station locates an information storage means upon which are stored the 1023 possible combinations of remaining pins after a first ball is thrown (a "strike" condition is not included) which have been reduced to 191 pin codes. Accompanying each of the 191 pin codes on the disc is a path code signifying which bowling path of the eleven recognized paths is the optimum path for the corresponding pin code. The pin codes and path codes on the disc which are at a common station for the system are scanned at a 3½ second rate, and transmitted over twenty-six common conductors to dual lane units which are located in the vicinity of the lanes. Each pair of lanes is controlled by one unit, referred to hereinafter as a dual lane unit, which is connected to the common station.

In operation, the common code generator during each 3½ second operating cycle will generate 191 twenty-bit codes corresponding to a logical reduction of the 1023 possible combinations of pins remaining after the first ball is thrown. These 191 codes will appear in sequence on twenty pin code conductors which extend to the dual lane units. Simultaneous with each generation and appearance of a code for a possible pin combination, a second code corresponding to the optimum path for a spare is transmitted over the four bowling path code conductors to the dual lane units. As a result, once during each operating cycle of the common equipment, a code indicating the particular pin combination left after the first ball is thrown, will be provided over the twenty-pin code conductors to the dual lane units and at the same time, a core corresponding to the optimum path for such combination will be provided to the dual lane unit over the four path conductors.

As will be shown, each dual lane unit controls the display boards for two lanes, the unit being connected to each board via a cable including eleven leads and a common conductor. Each dual lane unit includes two coincidence and display circuits, each containing circuitry cooperating with contacts of the regular pinspotter relays for its associated lane. That is, conventional pinspotter systems now used in the field are operative after a ball has been rolled to indicate which of the ten pins remain standing and which of the pins are down. In pinspotters of this type, ten relays are provided, each of which represents the position of a different one of the ten pins (pin indicator storage relays). As will be shown, the contacts of these relays for a lane are available to present a ten-bit code to the coincidence and display circuit in the associated dual lane unit. As a result, after a ball is thrown, each lane unit receives information from the pinspotter relative to the actual pin positions in the lane.

As the disc in the common equipment turns to transmit to each lane the repertory of codes thereon, code by code, representing all possible combinations of the pins, a coincidence of the pin combination represented by the contacts on the pin indicator storage relays at a lane with one of the pin codes transmitted by the common equipment eventually occurs. The lane coincidence and display circuit in a dual lane unit for detecting such coincidence is prepared for operation by extra contacts on the regular ball #2 relay which closes whenever the lane equipment prepares for the second ball. The codes indicating the optimum path which are continually received with the corresponding pin codes are ignored by the lane equipment until coincidence is detected between the codes indicating the actual pins standing and the code received from the central station. After the second ball relay contacts have closed, the above described coincidence sets up circuitry which enables optimum path information on the conductors to be used to control relays which effect energization of the lamps which provide such display, such relays being locked until the ball #2 relay in the pinspotter equipment releases.

As will be shown, the twenty pin-position conductors which provide the 191 codes from the central station to the dual lane units provide "dual rail" operation; that is, a marking is provided by the twenty conductors for each of the two positions of each contact on the ten pin indicator relays to permit the comparison of the twenty elements of the codes with the twenty contact positions presented by the pin indicator relay. Furthermore, such arrangement permits packaging of the individual alley equipment in dual lane units whereby the expense of wiring and installation is reduced, and maintenance problems and cost are correspondingly decreased.

DETAILED DESCRIPTION

The novel system is shown diagrammatically in FIGURE 1 in its manner of cooperation with conventional bowling alley equipment, designated generally at 100. The central or common station is shown to include central code generating unit 101 and power supply 104. The central code generating unit 101 is connected to each dual lane unit, such as 110, over twenty pin code leads, which are illustrated as being in cable 102; and four path code leads, which are illustrated as being in cable 103. As shown, cables 102, 103 are multiplied to all dual lane units, such as 110 . . . 116. Each dual lane unit, such as 110, controls the display boards, such as 113, 114 for two lanes, such as lane 1 and lane 2. The specific structure of central code generator unit 101 will be disclosed more fully hereinafter with reference to FIGURE 2.

Power supply 104 has power outputs including −24 v., −12 v., +12 v. conductors and a common grounded conductor. The −24 v. lead and the grounded common lead are multipled to all dual lane units, and the +12 v., −12 v., and grounded common leads are extended to the central code generating unit 101. For purposes of simplifying the disclosure, the pin code cable 102, the path code cable 103, the −24 v. conductor, and the common grounded conductor which are multipled to all dual lane units, are represented hereinafter by cable 109.

Coded signals provided over the pin and path conductors of cable 109 to each of the dual lane units, such as 110, every 3½ seconds are used by the dual lane units to energize the lamps 1–10 on the associated pin indicator display boards, such as 113, via a group of eleven conductors, indicated by cable 111, to identify the optimum path for a spare. In the illustration shown on display board 113, for example, the lighted 2–4 path indicator advises the bowler as to the suggested optimum path for throwing the ball to make a spare when pins 2, 4 and 9 remain standing. In like manner, dual lane unit 110 over cable 112 lights path indicator lamps on the display board 114 for lane 2; dual lane unit 116 lights path indicator lamps on the display board 118 for lane 23 via cable 116; and dual lane unit 117 lights path indicator lamps on the display board 119 for lane 24. The eleven paths which may be energized are shown in FIGURE 7.

SPECIFIC DESCRIPTION OF CODE GENERATION

Referring to FIGURE 2, a glass disc member 203 is supported on suitable shaft means 206 which is driven in a counter clockwise direction (looking down at the disc) by a conventional 110 volt A.C. motor 205 at a rate of approximately 17 r.p.m., whereby the disc completes one revolution in approximately 3½ seconds.

The 191 codes representative of the 1023 possible pin combinations remaining after the first ball are registered on disc 203 by means of transparent and opaque segments arranged in different patterns to represent different codes. These codes may be placed on disc 203 by various means, one of which might consist of providing a photographic emulsion on the upper or lower surface of the disc, exposing the emulsion to light via a negative, and thereafter developing the exposed negative to provide a positive pattern.

The specific codes carried by the disc 203 are shown in FIGURE 4. As there shown, the disc is divided into eleven sections labelled 1, 1–2 . . . , each of which section locates the codes for the pin combinations which are best satisfied by such paths. Thus, the arc labelled 1 locates the codes for the pin conditions which are best satisfied by rolling the ball along path 1, the arc 1–2 locates the codes for the pins for which the optimum path is path 1–2, etc. The codes appearing in each of the different sections are radially contiguous as best evidenced by the indicia 1, 2, 3 . . . 191 on the periphery of the disc. Thus, code 1 reading from the outer periphery toward the center and neglecting the "clock" bit has twenty bits which as shown also in FIGURE 5 consist of one transparent bit, two opaque bits, one transparent bit, one opaque bit, one transparent bit and fourteen opaque bits which represent the pin combination in which pin 1 is down, pins 2 and 3 are up, and the position of pins 4–10 is of no import. The remaining four codes (one opaque and three transparent) represent path one as the preferred path for such pin pattern. Each of the other 190 codes likewise has twenty-four bits (twenty pin and four path bits), and accordingly when located in radially adjacent positions on the disc form twenty-four concentric code tracks around the disc. The outermost track comprises a clock pulse track for use in systems employing clock pulses in the electronic circuitry in a manner to be set forth hereinafter.

The first two radial positions prior to and adjacent the code marking just described, do not represent codes and are used for reference or test purposes only in a system using clock pulses, and do not effect or affect any code selections. In a system which does not use clock pulses, these first two radial positions would not be incorporated in the pattern. The specific nature of the 191 codes is set forth in chart form hereinafter.

CODE READOUT

Underneath the code disc 203 as shown in FIGURE 2 is an assembly of twenty-five photocells arranged to scan the codes on the disc in its movement thereabove. As illustrated, from left to right, the photocells are mounted in three banks which are spaced from each other, and specifically comprise an outer bank of ten cells supported in a first holder, a middle bank of ten cells supported in a second holder, and an inner bank of five cells mounted in a third holder. The spaces between the banks correspond to a photocell width and are provided between the banks for manufacturing convenience, although a single bank of twenty-five cells without spaces could be used if desired. As will be shown as the code disc 203 rotates counter clockwise (looking down at the top of the disc), the photocells scan the codes in a clockwise order.

For purposes of example, the first code of the 191 codes on the disc (which is also the first code in the group of codes for patterns best served by path 1) is illustrated in FIGURE 5 as viewed from above, the disc looking down toward the photocells. Such code, as noted in the description relative to FIGURE 4 occurs at the third radial position reading clockwise from the right hand side of the path 1 index, and is identified by the numeral 1 on the periphery of the disc.

As shown in FIGURE 5, the photocells read out a code including ten bits, a space, ten bits, a space, and five bits which extend from the periphery of the disc toward the center of the disc, as marked in the drawing. In one embodiment the first or clock bit is not present or is not used. The spaces are provided between the groups in the present embodiment to correspond to the spaces between the banks of photocells, and are represented by opaque segments on the disc. Each of the bits in a code constitutes one segment of one of the twenty-five circular concentric paths on the disc. As will be further apparent, each bit in a code is represented by either a transparent segment to let light from light source 201 pass therethrough to the associated photocell.

As shown in FIGURE 2, each of the 25 photocells is mounted to scan a different one of the 25 circular paths. Since each set of codes representing a pin position and the optimum path therefor extends along a radial line of the disc, each of the bits of the code are presented simultaneously to the 25 photocells. Thus there will be a photocell to readout the representation of each of the squares shown in FIGURE 5. The photocells, are for purposes of the description, numbered 25 and 1–24 from left to right for a reason which will become apparent hereinafter.

Each photocell in one preferred embodiment comprises a p-n silicon diode, such as described in International Rectifier Bulletin No. SR-278-A, and is poled as shown in FIGURE 2A. Briefly, as shown in FIGURE 2A each diode has its cathode connected to ground and its anode connected to an associated output conductor, represented by the leads 207–1 to 207–24 and 207–25 (in systems employing clock pulses).

The 191 pin codes on the disc which represent the 1023 possible pin combinations, are "dual rail" for logic purposes, and as shown in FIGURES 2 and 5, two tracks on the disc and two associated photocells are required to represent each pin in a pattern, so that twenty tracks and the associated twenty photocells provide a pin code which represents the ten pins 1–10. The path code portion of the radial code, as shown at the right of FIGURE 5, is "single rail" and the indicated four tracks are used with four associated photocells to provide sixteen combinations of which only eleven are required to represent the eleven optimum paths.

The signals generated to represent the different positions of a pin are shown in the lower left position of FIGURE 5. Code 0 which is provided when a pin is down, consists of a transparent square at the left and an opaque square at the right, whereby the photocell associated with the left hand square provides a reverse biassing signal for an associated circuit as will be shown, and the photocell associated with the right hand cell is inactive. Code 1 which is provided when a pin is up is represented by an opaque square at the left and a transparent square at the right, whereby the photocell associated with the square at the left is inactive and the photocell associated with the square at the right in the "reverse biassing condition." Code X represents an indifferent situation in which the up or down position of the pin does not make any difference in determining the ball path. The code for an "indifferent" situation is represented by two opaque squares, whereby the two assocated photocells will be non-conductive.

The path codes provided by the squares are shown at the lower right of FIGURE 5 and as there shown, code 0 is represented by a transparent square, whereby its associated photocell is in the "reverse biassing" condition, and code 1 is represented by an opaque square, whereby its associated photocell is in the inactive condition. As will be shown with a photocell in the "reverse biassing" condition, the associated marking lead will be near +.4 volts and with the photocell inactive the associated marking lead will be —.3 volt.

SCANNING OPERATION

The manner in which marking of the associated circuitry is effected will now be described with reference to FIGURE 2. As there shown, light from light source 201 is focused by a cyclindrical lens 202 on the disc in such manner that, as the disc rotates counter clockwise, looking down from above, successive radial code positions are scanned clockwise, the photocells of the assembly 204 responding to the succesive codes on the disc to selectively change the signals on the output leads 207–1 to 207–24 connected to the photocells. Lead 207–25 will be discussed further hereinafter with reference to an embodiment involving clock pulses.

The output signals on leads 207–1 to 207–24, which are shown as cable 207, are transmitted to amplifier circuits 207–1A to 207–24A which in turn are connected to power inverters 207–1B to 207–24B. The outputs of these power inverters are connected over conductors 207-1C to 207-24C, and cables 102, 103 to the dual lane equipment for each pair of lanes (FIGURE 1). Leads 207-1C to 207-20C of this group are pin code leads, shown as pin code cable 102, which are connected in multiple to each of the dual lane units. Leads 207-21C to 207-24C are path code leads and are extended as path code cable 103, multiplied to each of the dual lane units. As noted earlier, cables 105, 106 are power leads which provide —24 v. and ground to the dual lane units.

As the disc 203 rotates a code into the readout position, and light passes through the transparent areas for a pin code to the photocells associated with the transparent areas of the code, a —12 v. signal is transmitted over the associated output conductor for the photocell to the associated amplifier equipment. Thus, assuming the first bit of the code (assuming no clock pulses) in the readout position is transparent, the second photocell 207-1' converts light energy directly into electricity, providing a reverse bias signal over its associated output lead 207-1 in cable 207 to the amplifier circuit 207-1A. In a similar manner a reverse bias output signal is transmitted over each of the conductors associated with a photocell which detects a transparent area in the code which is in the readout position. Each photocell which detects an opaque square in the code will remain inactive, and the signal to its associated amplifier will be —.3 volt.

It will be apparent therefrom that as disc 203 moves a pin code into scan position, the 24 conductors 207-1 through 207-20 will provide a twenty bit code representative of a pin pattern and the four conductors 207-20 through 207-24 will be marked with a preferred path for such pin pattern. The circuity and its manner of response to the signals provided on conductors, such as 207-1, by the scanning of disc 203 will now be described in detail.

As shown in FIGURE 2, the amplifier 207-1A and power inverter 207-1B are connected for control by the signal on conductor 207-1. Assuming that the photocell connected to lead 207-1 is not activated by light (i.e., an opaque signal is above the photocell), the photocell remains inactive, and as a result, transistor 209 will conduct and transistor 210 will be turned off, which in turn allows transistor 218 to conduct placing a signal close to ground on pin code lead 207-1C.

Assuming that the photocell connected to lead 207-1 had detected a transparent area it would have been activated by light so that the photocell provides a reverse biassing signal on the conductor 207-1 turning this transistor off. The collector of transistor 209 goes negative, causing transistor 210 to conduct, shunting transistor 218. As a result thereof, transistor 218 is cut off and the collector of transistor 218 goes negative to in turn place a negative potential near —12 volts on pin code lead 207-1C. The amplifiers 207-2A through 207-20A and associated power inverters 207-20B through 207-24B are operative in like manner as the signals on the input conductor 207-2 through 207-24 are varied to represent an opaque or transparent signal of the code readout. The signals on conductors 207-IC . . . 207-20C are transmitted over pin cable 102 and path cable 103 to each of the dual lane units, such as 110, for each pair of lanes in the system.

DUAL LANE UNIT 110

Referring now to FIGURE 3, the box at the left includes sets of form C contacts P1-P10 which are available on the pinspotter relays (not shown) for a conventional pinspotter unit, which for the purpose of the description, will be assumed to be pinspotter equipment for lane 1. After the first ball has been rolled, and the remaining pins replaced, individual ones of these relays will be operated or nonoperated according to whether the corresponding pin is standing or down. Thus, if pin 1 is not standing, its associated relay having contacts P1 will be non-operated, and the contacts P1 will be in the nonoperated position as shown. If pin 2 is standing, its associated relay having contacts P2 will be operated, and the contacts P2 will be in the operated position as shown. The status of each of the other pins will be represented in like manner by the condition of contacts P3-P10.

The standing or down position of pins can thus be read from the position of the contacts P1-P10. In the illustration shown in the drawing, the contacts P1-P10 indicate that pins 1 and 4-10 are down; and only pins 2 and 3 remain up. (This is a somewhat unusual but possible situation.) Actually from the standpoint of providing advice to the bowler, if pin 1 is down and pins 2 and 3 are standing, the up or down condition of pins 4-10 makes no difference as far as determining the optimum path for rolling the second ball in an attempt to get a spare. It will be apparent therefrom that the same code can be used to represent a number of different pin patterns or combinations.

Each of the levers of contacts P1-P10 are connected as inputs to AND gate 301 which, as will be shown, for the pin pattern shown will control the display board to illuminate path 1 as the optimum path for the next ball. Gate 301 will give an output signal (which also will be a ground signal) only if all inputs to gate 301 are grounded. As will now be shown, this condition (i.e., all ground inputs to gate 301) will be met only when the code on the disc 203 for the pattern for pin 1 down, pins 2 and 3 standing, with the remaining pins either down or standing, which is code 1, arrives at the readout position. Such code is shown in FIGURE 5, and at noted heretofore, is the first path code in the group of codes for paths which are best satisfied by rolling the ball along path 1 of the eleven paths shown on the display board.

More specifically, with reference to FIGURE 5 (and recalling that a transparent area, such as shown beneath the photocell associated with lead 207-1C, results in a potential near —12 v. on the output lead, such as 207-1C, and an opaque area such as shown beneath the photocell associated with lead 207-2C results in ground on such lead), it will be apparent that —12 v. will be on lead 207-1C, ground will be on lead 207-2C, —12 v. will be on lead 207-4C, ground will be on lead 207-5C, —12 v. will be on lead 207-6C, and ground will be on leads 207-7C, through 207-20C.

With reference to FIGURE 5, it will be apparent that with pins 2 and 3 standing, contact P1 is in the lower position and contacts P2, P3 are operated to the upper position. As a result, the —12 v. on leads 207-1C and 207-4C and 207-6C as extended over pin code cable 102 will not reach AND gate 301. Since each of the other conductors has ground thereon, AND gate 301 will conduct, and a ground signal will be extended over its output conductor 301A to an input on each of the AND gates 302–305. It should be noted that with the code shown in FIGURE 5, ground will be furnished through levers P4-P10 whether or not these levers are up or down (i.e., whether or not the associated relays are up or down, or whether or not the associated pins are up or down).

With AND gate 301 providing a ground output to gates 302–305, the output of each of the gates 302–305 depends upon the condition of its second input lead 207-21C, to 207-24C. Again, referring back to FIGURE 5, with the path code there shown (one opaque segment followed by three transparent segments) path code lead 207-21C will have ground thereon, and each of the leads 207-22C to 207-24C will have —12 v. thereon. Accordingly, since only AND gate 302 has ground on both inputs, it alone will give out a ground signal to energize its associated electromagnetic relay 306. The energizing path for relay 306 may be traced from ground supplied by AND gate 302, through the winding of relay 306, the contacts of the ball #2 relay (which relay is standard lane equipment) to the —24 v. bus 105. Relay 306 operates, and at its contacts 306A locks independent of gate 302 over a path which extends from ground on the common lead 106, contacts 306–A on relay 306, through the winding of relays 306 and the ball #2 relay contacts, to the −24 v. lead 105. The relay 306 will remain locked over such circuit until the second ball is thrown and the ball #2 contacts open.

It will be apparent with such circuit connection, the turning of disc 203 to provide different readouts over leads 207–1C through 207–24C will not result in the operation of any of the relays 306–309 unless the ball #2 relay contacts have been closed. Also, it should be noted that, as the disc 203 turns, it traverses a radial code in about 18 milliseconds, and that the characteristics of relays 306–309 are selected to provide ample time to operate and lock.

As the disc 203 rotates a subsequent code on the disc into scanning position, at least one of the inputs to gate 301 will be at −12 volts causing gate 301 to give a −12 v. output over conductor 301A to gates 302–305 which will therefore withhold ground potential from the associated relays 306–309. Such will be the case for each code in the scanning of other radial positions during the period the detected pin pattern remains. Relay 306 which was energized, as described above, remains locked over the described holding circuit.

Relays 306–309 control a fan of relay contacts 306B–F; 307B–D, 308B–C, and 309B interconnected as shown to control selective energization of the display of different paths in the display board. It will be seen that one side of a 13½ A.C. source is connected to the fan via lead 311, the other side being connected to the common lead 310 which goes via cable 111 to the lane 1 display board. Conductor 311 is selectively connected by the fan to any one of the eleven ball path leads PA1 to PA10 which extend via cable 111 to the display board for lane 1. Thus, each ball path indicator on the display board is arranged to be selectively illuminated when an associated one of the conductors PA1–PA10 is energized.

By way of example, with relay 306 operated and relays 307–309 non-operated responsive to code 1, with movement of the code in FIGURE 5 to the readout position, a path can be traced to light the path 1 indicator which extends from lead 311, break contacts 309B, 308C, 307D, make contacts 306F, and lead PA1 in cable 111 to the lamp (not shown) which illuminates the path 1 indicator, and back through the common lead 310 to the A.C. source. Inspection of the contact fan will show that at this time none of the other path leads PA2–PA10 are connected through to the display board.

After the bowler has rolled the second ball, and the lane is restored, the ball #2 relay contacts will open, and relay 306 will be released to interrupt the energizing circuit for the path 1 indicator lamp.

PATH CODES

As noted hereinbefore, the system will indicate the preferred path of eleven different paths for the one of the 1023 pin combinations which remains. As the code on the disc assigned to represent such condition is read out, the appropriate relays of the group 306–309 operate to display the appropriate path of the eleven. The various path codes in the system, the relays operated in response to the codes and paths determined as the result thereof are summarized as follows:

| Path Code | Relays Operated | Path Determined |
|---|---|---|
| 1000 | 1 | 1 |
| 0100 | 2 | 1–2 |
| 0001 | 4 | 1–3 |
| 0010 | 3 | 2 |
| 1100 | 1  2 | 2–4 |
| 0110 | 2  3 | 3 |
| 1010 | 1  3 | 3–6 |
| 0011 | 3  4 | 4 |
| 1110 | 1  2  3 | 6 |
| 1001 | 1  4 | 7 |
| 0101 | 2  4 | 10 |

PIN CODES

It will be recalled that the 1023 possible combinations of pins remaining standing after the first ball is thrown are reduced to 191 pin codes. Referring again to FIGURE 4, it will be recalled that the first two codes extending in a radial direction adjacent to arc 1 of the disc are for test purposes in a system which uses clock pulses. In systems not using clock pulses, these first two code positions are not present, the radial codes after the first two radial codes are identified as codes 1 to 191 reading around the disc clockwise. These codes identified by the indicia 1, 2, 3 . . . 191 on the entire periphery of the disc are as follows:

PATH 1 CODES

| Code Number | \multicolumn{10}{c}{Pins / Pin Code} | Path Code |

| Code Number: | 1 | 2 | 3 | 4 | 5 | 6 | 7 | 8 | 9 | 10 | Path Code |
|---|---|---|---|---|---|---|---|---|---|---|---|
| 1 | 0 | 1 | 1 | X | X | X | X | X | X | X | 1000 |
| 2 | 0 | 0 | 0 | 0 | 1 | 0 | 0 | 0 | 0 | 0 | 1000 |
| 3 | 1 | 0 | 0 | 0 | 0 | 0 | 0 | 0 | 0 | 0 | 1000 |
| 4 | X | 0 | 0 | 0 | 0 | 0 | 0 | 1 | 1 | X | 1000 |
| 5 | 1 | 0 | 0 | 0 | 1 | 0 | 0 | X | X | X | 1000 |
| 6 | 1 | 0 | 0 | 0 | 1 | 0 | 0 | 0 | X | X | 1000 |
| 7 | 1 | 0 | 0 | 0 | 1 | 0 | 1 | 1 | X | X | 1000 |
| 8 | 1 | 0 | 0 | 0 | 1 | 0 | 1 | 0 | 0 | 1 | 1000 |
| 9 | 1 | 0 | 0 | 0 | 1 | 0 | 1 | 0 | 1 | X | 1000 |
| 10 | 1 | 0 | 0 | 1 | 1 | 0 | X | X | X | X | 1000 |
| 11 | 1 | 0 | 1 | 0 | 0 | 0 | 0 | 1 | 0 | 0 | 1000 |
| 12 | 1 | 1 | 0 | 0 | 0 | 0 | X | 0 | 1 | 1 | 1000 |
| 13 | 1 | 1 | 0 | 0 | 0 | 0 | 0 | 1 | X | 0 | 1000 |
| 14 | 1 | 1 | 0 | 0 | 0 | X | 1 | 1 | 1 | X | 1000 |
| 15 | 1 | 1 | 0 | 0 | 1 | 0 | X | X | X | 0 | 1000 |
| 16 | 1 | 1 | 0 | 0 | 1 | 0 | 1 | X | 1 | 1 | 1000 |
| 17 | 1 | 1 | 0 | 1 | 0 | 0 | 0 | 0 | 1 | 1 | 1000 |
| 18 | 1 | 1 | 0 | 1 | 0 | X | X | 1 | 1 | X | 1000 |
| 19 | 1 | 1 | 0 | 1 | 1 | 0 | 0 | 0 | 0 | 0 | 1000 |
| 20 | 1 | 1 | 0 | 1 | 1 | 0 | 0 | 0 | 1 | X | 1000 |
| 21 | 1 | 1 | 0 | 1 | 1 | 0 | 0 | 1 | X | 0 | 1000 |
| 22 | 1 | 1 | 0 | 1 | 1 | 0 | 1 | X | 1 | 1 | 1000 |
| 23 | 1 | 1 | 0 | 1 | 1 | 0 | 1 | X | X | 0 | 1000 |
| 24 | 1 | 1 | 1 | 0 | 0 | 0 | X | 1 | 1 | X | 1000 |
| 25 | 1 | 1 | 1 | 0 | 0 | 1 | 0 | 1 | 1 | X | 1000 |
| 26 | 1 | 1 | 1 | 1 | 0 | 0 | 0 | 1 | 1 | X | 1000 |
| 27 | 1 | 1 | 1 | 1 | 0 | 0 | 1 | 1 | 1 | 1 | 1000 |
| 28 | 1 | 1 | 1 | 1 | 0 | 1 | 1 | 1 | 1 | X | 1000 |

PATH 1-2 CODES

| Code Number: | 1 | 2 | 3 | 4 | 5 | 6 | 7 | 8 | 9 | 10 | Path Code |
|---|---|---|---|---|---|---|---|---|---|---|---|
| 29 | 1 | 0 | 1 | 0 | 0 | 0 | 0 | 1 | 0 | 1 | 0100 |
| 30 | 1 | 0 | 1 | 0 | 0 | 0 | 1 | 1 | 0 | X | 0100 |
| 31 | 1 | 0 | 1 | 0 | 0 | 1 | X | 1 | 0 | X | 0100 |
| 32 | 1 | 0 | 1 | 1 | 0 | 1 | 0 | 1 | 0 | X | 0100 |
| 33 | 1 | 0 | X | 1 | 0 | 1 | 1 | X | 0 | 0 | 0100 |
| 34 | 1 | 0 | 1 | 1 | 0 | 1 | 1 | 1 | 0 | 1 | 0100 |
| 35 | 1 | 1 | 0 | 0 | 0 | 0 | 0 | 0 | 0 | X | 0100 |
| 36 | 1 | 1 | 0 | 0 | 0 | 0 | 0 | 1 | X | 1 | 0100 |
| 37 | 1 | 1 | 0 | 0 | 0 | 1 | 0 | 1 | X | X | 0100 |
| 38 | 1 | 1 | 0 | 0 | 1 | 0 | 0 | X | X | 1 | 0100 |
| 39 | 1 | 1 | 0 | 0 | 1 | 0 | 1 | X | 0 | 1 | 0100 |
| 40 | 1 | 1 | 0 | 1 | 0 | 0 | X | X | 0 | X | 0100 |
| 41 | 1 | 1 | 0 | 1 | 0 | 1 | X | X | 0 | 0 | 0100 |
| 42 | 1 | 1 | 0 | 1 | 1 | 0 | X | X | 0 | 1 | 0100 |
| 43 | 0 | 0 | 0 | 0 | 1 | 0 | 0 | 0 | X | 1 | 0100 |
| 44 | 0 | 0 | 0 | 0 | 1 | 0 | 0 | 1 | 0 | X | 0100 |
| 45 | 0 | 0 | 0 | 0 | 1 | 0 | 0 | 1 | 1 | 1 | 0100 |
| 46 | 0 | 0 | 0 | 0 | 1 | 0 | 1 | X | 1 | 1 | 0100 |
| 47 | 0 | 1 | 0 | 0 | 0 | 0 | 0 | 1 | 0 | 0 | 0100 |
| 48 | 0 | 1 | 0 | 0 | 1 | X | 1 | X | X | 0 | 0100 |
| 49 | 0 | 1 | 0 | X | 0 | X | X | 1 | 1 | X | 0100 |
| 50 | 0 | 1 | 0 | 1 | 1 | X | X | X | X | 0 | 0100 |
| 51 | 1 | 0 | 0 | 0 | 0 | 0 | 0 | 0 | X | 1 | 0100 |
| 52 | 1 | 0 | 0 | 0 | 0 | 0 | 1 | 0 | 0 | 1 | 0100 |
| 53 | 1 | 0 | 0 | 0 | 0 | 0 | X | 1 | 0 | X | 0100 |
| 54 | 1 | 0 | 0 | 0 | 0 | 0 | 1 | 1 | 1 | 1 | [1] 0100 |
| 55 | 1 | 0 | 0 | 0 | 0 | 1 | 1 | 1 | 0 | 0 | 0100 |
| 56 | 1 | 0 | 0 | 1 | 0 | 0 | X | 0 | 0 | X | 0100 |
| 57 | 1 | 0 | 0 | 1 | 0 | 0 | X | 0 | 1 | 1 | 0100 |
| 58 | 1 | 0 | 0 | 1 | 0 | 0 | X | 1 | X | X | 0100 |
| 59 | 1 | 0 | 0 | 1 | 0 | 1 | 0 | 1 | 0 | 0 | 0100 |
| 60 | 1 | 1 | X | 0 | 0 | 1 | X | 0 | X | 0 | 0100 |
| 61 | 1 | 1 | 1 | 0 | 0 | X | 0 | 1 | 0 | X | 0100 |
| 62 | 1 | 1 | X | 0 | 0 | 1 | 1 | X | 0 | 0 | 0100 |
| 63 | 1 | 1 | X | 0 | 0 | X | 1 | 1 | 0 | 1 | 0100 |
| 64 | 1 | X | 1 | 1 | 0 | 0 | X | X | 0 | X | 0100 |
| 65 | 1 | 1 | 1 | 1 | 0 | 1 | 0 | X | 0 | 0 | 0100 |
| 66 | 1 | 1 | X | 1 | 0 | 1 | X | 1 | 0 | 1 | 0100 |

[1] This is an impossible or highly improbable leave but is on the disc.

PATH 1-3 CODES

| Code Number | \. | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 67 | 0 | 0 | 0 | 0 | 1 | 0 | X | X | 1 | 0 | 0001 |
| 68 | 0 | 0 | 0 | 0 | 1 | 0 | 1 | X | 0 | X | 0001 |
| 69 | 0 | 0 | 1 | 0 | 0 | 0 | 0 | 1 | X | 0 | 0001 |
| 70 | 0 | 0 | 1 | 0 | 0 | 0 | 1 | 1 | 1 | 0 | 0001 |
| 71 | 0 | 0 | 1 | 0 | 0 | 1 | 0 | 1 | 0 | 0 | 0001 |
| 72 | 0 | 0 | 1 | 0 | 1 | 0 | 0 | 0 | X | 0 | 0001 |
| 73 | 0 | 0 | 1 | 0 | 1 | 0 | 0 | 0 | 1 | 1 | 0001 |
| 74 | 0 | 0 | 1 | 0 | 1 | 0 | X | 1 | X | X | 0001 |
| 75 | 0 | 0 | 1 | 0 | 1 | 1 | X | 1 | X | 0 | 0001 |
| 76 | 1 | 0 | 0 | 0 | 0 | 0 | 0 | 0 | 1 | 0 | 0001 |
| 77 | 1 | 0 | 0 | 0 | 0 | 0 | 1 | 0 | X | 0 | 0001 |
| 78 | 1 | 0 | 0 | 0 | 0 | 0 | 1 | 0 | 1 | 1 | 0001 |
| 79 | 1 | 0 | 0 | 0 | 0 | 1 | 1 | 1 | 1 | 0 | 0001 |
| 80 | 1 | 0 | 0 | 0 | 0 | 1 | 0 | X | X | X | 0001 |
| 81 | 1 | 0 | 0 | 0 | 0 | 1 | 1 | 0 | X | X | 0001 |
| 82 | 1 | 0 | 0 | 0 | 0 | 1 | 1 | 1 | 0 | 1 | 0001 |
| 83 | 1 | 0 | 0 | 0 | 1 | 0 | 1 | 0 | 0 | 0 | 0001 |
| 84 | 1 | 0 | 0 | 1 | 0 | 1 | 0 | 0 | X | X | 0001 |
| 85 | 1 | 0 | 0 | 1 | 0 | 1 | 0 | 1 | 0 | 1 | 0001 |
| 86 | 1 | 0 | 0 | 1 | 0 | 1 | 0 | 1 | 1 | X | 0001 |
| 87 | 1 | 0 | 0 | 1 | 0 | 1 | 1 | X | 0 | 1 | 0001 |
| 88 | 1 | 0 | 1 | 0 | 0 | 0 | X | 1 | 1 | X | 0001 |
| 89 | 1 | 0 | 1 | 0 | 0 | X | X | 0 | X | X | 0001 |
| 90 | 1 | 0 | X | 0 | 0 | 1 | 1 | 1 | 1 | X | 0001 |
| 91 | 1 | 0 | 1 | 1 | 0 | 0 | X | X | 1 | X | 0001 |
| 92 | 1 | 0 | 1 | 1 | 0 | 1 | 0 | 0 | X | X | 0001 |
| 93 | 1 | 0 | 1 | X | 0 | 1 | 0 | 1 | 1 | X | 0001 |
| 94 | 1 | 0 | X | 1 | 0 | 1 | 1 | X | 1 | X | 0001 |
| 95 | 1 | 1 | 0 | 0 | 0 | 0 | X | 0 | 1 | 0 | 0001 |
| 96 | 1 | 1 | 0 | 0 | 0 | 1 | 0 | 0 | X | X | 0001 |
| 97 | 1 | X | 0 | X | 1 | 1 | X | X | X | X | 0001 |
| 98 | 1 | X | 0 | 1 | 0 | 0 | X | 0 | 1 | 0 | 0001 |
| 99 | 1 | 1 | 0 | 1 | 0 | 0 | 1 | 0 | 1 | 1 | 0001 |
| 100 | 1 | 1 | 0 | 1 | 0 | 1 | X | 0 | 0 | 1 | 0001 |
| 101 | 1 | 1 | 1 | 0 | 0 | X | 0 | 0 | X | X | 0001 |
| 102 | 1 | 1 | 1 | 0 | 0 | 0 | 1 | 0 | 1 | X | 0001 |
| 103 | 1 | 1 | X | 0 | 0 | 1 | 1 | 0 | 0 | 1 | 0001 |
| 104 | 1 | 1 | X | 0 | 0 | 1 | 1 | 0 | 1 | X | 0001 |
| 105 | 1 | 1 | 1 | 1 | 0 | 0 | X | 0 | 1 | X | 0001 |
| 106 | 1 | 1 | 1 | 1 | 0 | 0 | 1 | 1 | 1 | 0 | 0001 |
| 107 | 1 | X | 1 | 1 | 0 | 1 | 1 | 0 | 0 | 1 | 0001 |
| 108 | 1 | 1 | X | 1 | 0 | 1 | X | 0 | 1 | X | 0001 |
| 109 | 1 | X | 1 | X | 1 | X | X | X | X | X | 0001 |

PATH 2 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 110 | 0 | X | 0 | 0 | 0 | 0 | 0 | 1 | 0 | X | 0010 |
| 111 | 0 | 0 | 0 | 1 | 1 | X | X | X | X | X | 0010 |
| 112 | 0 | 0 | 1 | 1 | 1 | X | X | X | X | X | 0010 |
| 113 | 0 | 1 | 0 | 0 | 0 | 0 | 0 | 0 | 0 | 0 | 0010 |
| 114 | 0 | 1 | 0 | 0 | 0 | 0 | 1 | 1 | 0 | 0 | 0010 |
| 115 | 0 | 1 | 0 | 0 | 0 | 1 | 0 | 1 | 0 | 0 | 0010 |
| 116 | 0 | 1 | 0 | 0 | 1 | X | 0 | 1 | X | 1 | 0010 |
| 117 | 0 | 1 | 0 | 0 | 1 | 0 | 1 | 1 | X | X | 0010 |
| 118 | 0 | 1 | 0 | 0 | 1 | 1 | 1 | 1 | X | X | 0010 |
| 119 | 0 | 1 | 0 | 1 | 0 | 0 | X | 1 | 0 | 0 | 0010 |
| 120 | 0 | 1 | 0 | 1 | 1 | X | 0 | 1 | X | 1 | 0010 |

PATH 2-4 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 121 | 0 | 0 | 0 | 1 | 0 | X | 0 | 1 | 0 | 0 | 1100 |
| 122 | 0 | 0 | 1 | 1 | 0 | 0 | 0 | 1 | 0 | 0 | 1100 |
| 123 | 0 | 1 | 0 | 0 | 0 | 0 | 1 | 0 | X | X | 1100 |
| 124 | 0 | 1 | 0 | 0 | 0 | 1 | 0 | 0 | 0 | 0 | 1100 |
| 125 | 0 | 1 | 0 | X | 0 | 1 | 1 | 0 | X | X | 1100 |
| 126 | 0 | 1 | 0 | 0 | X | 0 | 0 | 0 | X | 1 | 1100 |
| 127 | 0 | 1 | 0 | 0 | 1 | X | 1 | 0 | X | X | 1100 |
| 128 | 0 | 1 | 0 | 1 | 0 | X | 0 | X | X | X | 1100 |
| 129 | 0 | 1 | 0 | 1 | 0 | 0 | 0 | 1 | 0 | 1 | 1100 |
| 130 | 0 | 1 | 0 | X | 0 | 1 | 0 | 1 | 1 | 0 | 1100 |
| 131 | 0 | 1 | 0 | 1 | 0 | 1 | 0 | 0 | X | X | 1100 |
| 132 | 0 | 1 | 0 | 1 | 0 | 1 | 0 | 1 | 0 | X | 1100 |
| 133 | 0 | 1 | 0 | X | 0 | 1 | 1 | 0 | 0 | X | 1100 |
| 134 | 0 | 1 | 0 | 1 | 1 | X | 0 | 0 | X | 1 | 1100 |
| 135 | 0 | 1 | 0 | 1 | 1 | X | 1 | X | X | 0 | 1100 |

PATH 3 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 136 | 0 | 0 | 0 | 0 | 1 | 1 | X | X | X | X | 0110 |
| 137 | 0 | 0 | 1 | 0 | 0 | 0 | 0 | 0 | X | 0 | 0110 |
| 138 | 0 | 0 | 1 | 0 | 0 | 0 | 0 | 0 | 1 | 1 | 0110 |
| 139 | 0 | 0 | 1 | 0 | 0 | 0 | 1 | 0 | 1 | 0 | 0110 |
| 140 | 0 | 0 | 1 | 0 | 0 | 1 | 0 | 0 | 1 | 0 | 0110 |
| 141 | 0 | 0 | 1 | 0 | 0 | 1 | 0 | 1 | 0 | 1 | 0110 |
| 142 | 0 | 0 | 1 | 0 | 1 | 1 | 0 | 0 | X | 0 | 0110 |
| 143 | 0 | 0 | 1 | 1 | 0 | 0 | 0 | 0 | 1 | 0 | 0110 |
| 144 | 0 | 1 | 0 | 0 | 1 | 1 | 0 | 0 | X | 1 | 0110 |
| 145 | 0 | 0 | 0 | 0 | 0 | 0 | 0 | 0 | 1 | 0 | 0110 |

PATH 3-6 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 146 | 0 | 0 | 0 | X | 0 | 1 | 0 | 0 | 1 | 0 | 1010 |
| 147 | 0 | 0 | 1 | 0 | 0 | 0 | X | 0 | 1 | 1 | 1010 |
| 148 | 0 | 0 | 1 | 0 | 0 | 0 | 1 | 1 | 1 | 1 | 1010 |
| 149 | 0 | 0 | 1 | 0 | 0 | 1 | X | 1 | 1 | 1 | 1010 |
| 150 | 0 | 0 | 1 | 0 | 0 | 1 | 1 | 0 | X | 1 | 1010 |
| 151 | 0 | 0 | 1 | 0 | 0 | 1 | 0 | 0 | 0 | X | 1010 |
| 152 | 0 | 0 | 1 | 0 | 0 | 1 | 0 | 0 | 1 | 1 | 1010 |
| 153 | 0 | 0 | 1 | 0 | 0 | 1 | 0 | 1 | 0 | 1 | 1010 |
| 154 | 0 | 0 | 1 | 0 | 0 | 1 | 0 | 1 | 1 | X | 1010 |
| 155 | 0 | 0 | 1 | 0 | 0 | 1 | 1 | X | X | X | 1010 |
| 156 | 0 | 0 | 1 | 0 | 1 | 0 | 0 | 0 | 0 | 1 | 1010 |
| 157 | 0 | 0 | 1 | 0 | X | 0 | 1 | 0 | 0 | X | 1010 |
| 158 | 0 | 0 | 1 | 0 | 1 | 1 | 0 | X | X | 1 | 1010 |
| 159 | 0 | 0 | 1 | 0 | 1 | 1 | 1 | 0 | X | X | 1010 |
| 160 | 0 | 0 | 1 | 0 | 1 | 1 | 1 | 1 | X | 1 | 1010 |
| 161 | 0 | 0 | 1 | 1 | 0 | 0 | 0 | 0 | 0 | 0 | 1010 |
| 162 | 0 | 0 | 1 | 1 | 0 | X | X | X | X | 1 | 1010 |
| 163 | 0 | 0 | 1 | 1 | 0 | 1 | X | X | X | X | 1010 |
| 164 | 0 | 1 | 0 | 0 | 0 | 1 | 0 | 0 | 1 | 0 | 1010 |

PATH 4 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 165 | 0 | 0 | 0 | 0 | 0 | 0 | 1 | 1 | X | X | 0011 |
| 166 | 0 | 0 | 0 | 1 | 0 | 0 | 0 | 0 | 0 | 0 | 0011 |
| 167 | 0 | 0 | 0 | 1 | 0 | X | 1 | 1 | 0 | 0 | 0011 |
| 168 | 0 | 0 | 0 | 1 | 0 | 1 | X | 0 | 0 | 0 | 0011 |
| 169 | 0 | 0 | 1 | 1 | 0 | 0 | 1 | 1 | 0 | 0 | 0011 |

PATH 6 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 170 | 0 | 0 | 0 | 0 | 0 | 0 | X | 0 | 1 | 1 | 1110 |
| 171 | 0 | 0 | 0 | 0 | 0 | 1 | 0 | 0 | 0 | 0 | 1110 |
| 172 | 0 | X | 0 | 0 | 0 | 1 | 0 | 0 | 1 | 1 | 1110 |
| 173 | 0 | 0 | 0 | 1 | 0 | 1 | 0 | 0 | X | 1 | 1110 |
| 174 | 0 | 0 | 0 | 1 | 0 | 1 | 1 | 1 | 1 | 1 | 1110 |

PATH 7 CODES

| Code Number | | | | | Pins | | | | | | Path Code |
|---|---|---|---|---|---|---|---|---|---|---|---|
| | 1 | 2 | 3 | 4 | 5 | 6 | 7 | 8 | 9 | 10 | |
| 175 | 0 | 0 | 0 | 0 | 0 | 0 | 1 | 0 | 0 | X | 1001 |
| 176 | 0 | 0 | 0 | 0 | 0 | 0 | 1 | 0 | 1 | 0 | 1001 |
| 177 | 0 | 0 | 0 | 0 | 0 | 0 | 0 | 0 | 0 | 1 | 1001 |
| 178 | 0 | 0 | 0 | 1 | 0 | 0 | 0 | X | 1 | X | 1001 |
| 179 | 0 | 0 | 0 | 1 | 0 | 0 | X | 1 | 0 | 1 | 1001 |
| 180 | 0 | 0 | 0 | 1 | 0 | 0 | 1 | 0 | X | X | 1001 |
| 181 | 0 | 0 | 0 | 1 | 0 | 0 | 1 | 1 | 1 | X | 1001 |
| 182 | 0 | 0 | 0 | 1 | 0 | 1 | 1 | 0 | 1 | 0 | 1001 |
| 183 | 0 | 0 | 0 | 1 | 0 | 1 | 1 | X | 0 | 1 | 1001 |
| 184 | 0 | 0 | 1 | 1 | 0 | 0 | 1 | 0 | 0 | 1 | 1001 |
| 185 | 0 | 0 | 1 | 1 | 0 | 0 | 1 | X | 1 | 0 | 1001 |

PATH 10 CODES

| | Pins | | | | | | | | | | Path Code |
|---|---|---|---|---|---|---|---|---|---|---|---|
| | 1 | 2 | 3 | 4 | 5 | 6 | 7 | 8 | 9 | 10 | |
| | Pin Code | | | | | | | | | | |
| Code Number: | | | | | | | | | | | |
| 186 | 0 | 0 | 0 | 0 | 0 | X | 0 | 0 | 0 | 1 | 0101 |
| 187 | 0 | 0 | 0 | 0 | 1 | 0 | 1 | X | X | | 0101 |
| 188 | 0 | 0 | 0 | 0 | 1 | 1 | X | X | X | | 0101 |
| 189 | 0 | 0 | 0 | 1 | 0 | 1 | 0 | 1 | X | 1 | 0101 |
| 190 | 0 | 0 | 0 | 1 | 0 | 1 | 1 | 1 | 1 | 0 | 0101 |
| 191 | 0 | 1 | 0 | 0 | 0 | 1 | 0 | X | 0 | 1 | 0101 |

The following combinations of the 1023 combinations are considered to be impossible or highly improbable in the normal game of bowling and accordingly have been left off disc 203 for practical reasons.

PATH 1 CODES

Pin codes

| Pins | 1 | 2 | 3 | 4 | 5 | 6 | 7 | 8 | 9 | 10 |
|---|---|---|---|---|---|---|---|---|---|---|
| | 1 | 1 | 0 | 1 | 1 | 0 | 0 | 1 | 1 | 1 |
| | 1 | 1 | 1 | 0 | 0 | 1 | 1 | 1 | 1 | 1 |
| | 1 | 1 | 1 | 1 | 0 | 1 | 0 | 1 | 1 | 1 |

PATH 1-2 CODES

Pin codes

| Pins | 1 | 2 | 3 | 4 | 5 | 6 | 7 | 8 | 9 | 10 |
|---|---|---|---|---|---|---|---|---|---|---|
| | 1 | 1 | 1 | 1 | 0 | 1 | 1 | 0 | 0 | 0 |

PATH 1-3 CODES

Pin codes

| Pins | 1 | 2 | 3 | 4 | 5 | 6 | 7 | 8 | 9 | 10 |
|---|---|---|---|---|---|---|---|---|---|---|
| | 1 | 1 | 1 | 0 | 0 | 1 | 1 | 1 | 1 | 0 |
| | 1 | 1 | 1 | 1 | 0 | 1 | 0 | 0 | 0 | 1 |
| | 1 | 1 | 1 | 1 | 0 | 1 | 0 | 1 | 1 | 0 |
| | 1 | 1 | 1 | 1 | 0 | 1 | 1 | 1 | 0 | 0 |

PATH 2-4 CODES

Pin codes

| Pins | 1 | 2 | 3 | 4 | 5 | 6 | 7 | 8 | 9 | 10 |
|---|---|---|---|---|---|---|---|---|---|---|
| | 0 | 0 | 0 | 1 | 0 | 1 | 0 | 1 | 1 | 0 |

PATH 7 CODES

Pin codes

| Pins | 1 | 2 | 3 | 4 | 5 | 6 | 7 | 8 | 9 | 10 |
|---|---|---|---|---|---|---|---|---|---|---|
| | 0 | 0 | 1 | 1 | 0 | 0 | 0 | 1 | 1 | 0 |

PATH 10 CODES

Pin codes

| Pins | 1 | 2 | 3 | 4 | 5 | 6 | 7 | 8 | 9 | 10 |
|---|---|---|---|---|---|---|---|---|---|---|
| | 0 | 0 | 0 | 1 | 0 | 1 | 1 | 0 | 1 | 1 |

As will be appreciated from a study of such codes, a substantial reduction in the number of codes to be recognized is achieved by reducing a plurality of code combinations for different "pin patterns" which require the same optimum path to a common code.

That is, in many cases, the same ball path is recommended whether or not certain pins are up or down. For example, the following combinations will be found both having ball path 1 associated therewith:

```
1 0 0 0 1 0 1 0 1 0    Path 1
1 0 0 0 1 0 1 0 1 1    Path 1
```

In this case, inasmuch as path 1 will be specified whether the tenth pin is up or down, a "don't care" digit X is assigned to the 10th place of both combinations which become identical as follows:

```
1 0 0 0 1 0 1 0 1 X    Path 1
```

In such manner, two combinations are reduced to one code which is placed on the disc, i.e., code No. 2.

As another example, the following combinations, each of which has ball path 1 as the optimum path, are reduced to a common code as shown below:

```
1 0 0 0 1 0 0 0 0 0    Path 1
1 0 0 0 1 0 0 0 0 1    Path 1
1 0 0 0 1 0 0 0 1 0    Path 1
1 0 0 0 1 0 0 0 1 1    Path 1
```

In this case, inasmuch as path 1 will be specified regardless of the up or down condition of the 9th and 10th pins, "don't care" digits XX are assigned to the 9th and 10th places of all four combinations thus reducing four combinations to a single code as follows, i.e., code No. 6.

```
1 0 0 0 1 0 0 0 X X    Path 1
```

Using this principle, it can be appreciated that code No. 1 on the disc 203 which is as follows:

```
0 1 1 X X X X X X X    Path 1
``` represents $2^7$ or one hundred and twenty-eight combinations all having path 1.

It is also possible in the interest of code reduction to eliminate impossible or highly improbable single combinations not involving an X. A code containing X or X's can be dropped if every member in it is impossible or highly improbable. The remaining 191 codes which have resulted from this reduction are placed radially around disc 203, segregated according to ball paths, although this segregation according to ball paths, while convenient, is not necessary and the codes could be placed in any order.

ALTERNATIVE CODE DISC ARRANGEMENT

Referring again to the code disc of FIGURE 4, if the clock track provided on the disc is used, an associated photocell is connected up for use therewith. Additionally, (1) the AND gate 301 will have an additional input lead thereto, and (2) the preliminary two test codes described above may be incorporated on the disc. It will be noted, however, that as no clock elements are associated with these two test codes, the added input to gate 301 will not have an input signal thereon, and there will be no lighting of ball path lights as a result of these two test codes. However, the leads 207–1C to 207–20C will selectively have ground or —12 v. thereon according to the codes, the first test code causing the makes of the pinspotter relays to be at ground potential and the breaks at —12 v.; the second test code causing the breaks to be at ground potential and the makes at —12 v. In this manner, testing by probing the make and break contacts of the pinspotter relays of FIGURE 3 is accomplished.

Referring to FIGURE 8, the system including the clock pulses is schematically represented thereat. As shown, each of the transparent clock elements on the disc 203 causes the photocell 207–25' to control amplifier 207–25A and power inverter 201–25B to place a ground signal on the additional input lead of gate 301. In between clock elements, —12 v. will be on the additional input to gate 301. Thus, the gate 301 will give an output only if a clock element is associated with a given code.

The clock elements on the disc will be chosen wide enough to allow the relays 306–309 to operate. With this arrangement, the ground signal on lead 301A to gates 302–305 will appear only after the ones of the leads 207–21C to 207–24C determined by the path code have received ground signals thereon, whereby the associated ones of the relays 306–309 are operated simultaneously. Furthermore, the ground signal on lead 301A disappears before the ground signals on leads 207–21C to 207–24C disappear whereby the relays 306–309 are released simultaneously.

By the use of clock pulses, any ambiguous or false signals to gate 301 between passage from one code to another is prevented. Without the use of clock pulses such ambiguous or false signals might cause gate 301 to give out short false signals to gates 302–305 which in turn may effect an undesired momentary energization of relays of the group 306–309. However, if the relays are chosen with operate times of sufficient length the relays will not close their contacts.

In the event electronic circuits having faster operate times are used in place of relays, clock pulses would be highly desirable to obviate false operation by ambiguity in passing between codes.

ANOTHER ALTERNATIVE CODE DISC ARRANGEMENT

Referring to FIGURE 6, the codes around disc 203 may also be separated by radial transparent spaces. With this arrangement, the transparent radial spaces cause the inputs to gate 301 all to be −12 v., thus avoiding ambiguity in passing from code to code. In actual practice, the width of the radial spaces would be only a fraction of that shown in FIGURE 6.

Although a code disc has been shown for illustrative purposes, various other information storage means such as an endless belt, drum or tape for accommodating the codes may be used. Further, other scanning or pickup means such as magnetic heads, electrical sensors, mechanical scanning involving fingers cooperating with slots and the like may be used in lieu of the photoelectric units. Further, while the arrangement shown is operative with automatic pinspotter equipment, it will be apparent that the system may be used with other forms of sensing devices which are capable of providing information relative to the actual pin positions.

TESTING

With the motor turned off, the disc can be advanced in radial position steps manually for testing purposes.

While what is described is regarded to be a preferred embodiment of the invention, it will be apparent that variations, rearrangements, modifications and changes may be made therein without departing from the scope of the present invention as defined by the appended claims.

What is claimed is:

1. A guidance display system for use with bowling lanes, each of which lanes has associated display means comprising a common signal generator means for providing a plurality of successive coded sets of signals in a cyclic manner, each coded set including a first group of signals representing a different possible up-down pattern of the bowling pins, and concurrently therewith a second group of signals identifying an optimum spare maker ball path for such pattern, control means for each lane for enabling the associated display means, linking means connected common to a plurality of said lanes for simultaneously providing a coded set of said first signal group to said control means at each of said plurality of lanes, said control means for each lane including position indicating means at each lane for providing an indication of the pin pattern at said lane, comparison means for comparing the pin pattern represented by the first group of code signals of said set with the pin pattern provided by said position indicating means, and enabling means responsive to detection of coincidence by said comparison means to provide a display on said display means of the optimum path indicated by said second coded signal set at the time of coincidence.

2. A system as set forth in claim 1 in which said common signal generator means includes stroage means which comprises a rotating disc, and in which each set of signals on said disc member comprises a group of transparent and opaque sections arranged in a coded pattern, the coded groups for different pin patterns being located in adjacent relation with each other, and in which said scanning means comprises photocell means located to provide simultaneous readout of the signals represented by said section to said display means.

3. A system as set forth in claim 1 in which said signal generator means includes means which comprise a rotating disc, and each of said coded signal sets comprises a plurality of coded indicia arranged along a radial line on the disc extending from the periphery toward the center of the disc, successive coded sets being located on adjacent radial lines about the surface of the disc.

4. A system as set forth in claim 1 in which said signal generator means includes storage means which include a storage member having said coded signal sets registered thereon, and in which a first and a second signal in each set is used to represent the position of one pin.

5. A system as set forth in claim 1 in which said signal generator means includes storage means which comprise a storage member having said coded signal sets registered thereon, the ones of the coded signal sets having a like second group of signals being arranged in adjacent positions on said storage member.

6. A system as set forth in claim 1 in which said display means includes a visual display unit for display of the optimum ball path for a given pin pattern, and in which each one of said first coded group of signals includes a first and a second signal for each pin, and in which said position indicating means for providing an indication of the actual pattern of pins includes a lever movable between two contact positions to represent the up and down positions of the pin, and in which said signal generator means includes means operative with readout of a code to transmit the two signals for a pin to the two different contact positions for such pin, and in which said enabling means includes first gate means connected to said levers for providing an output signal only with detection of coincidence by said comparison means, and second gate means for effecting energization of the preferred path on the display unit responsive to simultaneous receipt of said coincidence signal and the signals of said second group.

7. A system as set forth in claim 1 in which said position indicating means comprises a pinspotter relay for each pin, each of which relays includes a contact set having a contact lever moved by its associated relay between make and break contacts to represent the position of its associated pin, and in which said enabling means includes a gate having its input connected to said levers, and said signals from said common signal generator are connected to said make and break contacts of the contact sets for the various pins, and in which said gate is operative whenever the pattern represented by the lever positions and the pattern represented by the code on said contacts coincides, and means responsive to operation of said gate means and receipt of said second group of signals associated with the coincident pattern to provide a display of the optimum ball path for said pattern.

8. A display means as set forth in claim 1 in which said enabling means includes a first gate means for providing an enabling signal only in response to a first group of signals from said common signal generator means which identifies the pattern represented by said position indicating means, and second gate means for controlling the display of the optimum ball path on said display means only responsive to receipt of said enabling signal and the second group of signals in the code set including the first group which provides said enabling signal.

References Cited

UNITED STATES PATENTS

| | | | |
|---|---|---|---|
| 2,784,397 | 3/1957 | Branson et al. | 340—146.2 X |
| 3,212,779 | 10/1965 | Gruss et al. | 273—54 |
| 3,218,631 | 11/1965 | Flieg et al. | 340—146.2 X |
| 3,223,416 | 12/1965 | Blewitt | 273—54 |
| 3,232,404 | 2/1966 | Jones | 340—146.2 |

ANTON O. OECHSLE, *Primary Examiner.*

M. R. PAGE, *Assistant Examiner.*

U.S. Cl. X.R.

340—146.2